(12) United States Patent
Emori et al.

(10) Patent No.: US 9,140,408 B2
(45) Date of Patent: Sep. 22, 2015

(54) GAS TANK AND MANUFACTURING METHOD OF GAS TANK

(75) Inventors: Sakuma Emori, Nagoya (JP); Daiki Shinohe, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 852 days.

(21) Appl. No.: 13/103,452

(22) Filed: May 9, 2011

(65) Prior Publication Data

US 2011/0209817 A1  Sep. 1, 2011

Related U.S. Application Data

(62) Division of application No. 13/003,064, filed as application No. PCT/JP2009/060067 on Jun. 2, 2009, now Pat. No. 8,172,108.

(30) Foreign Application Priority Data

Jul. 9, 2008  (JP) ................................. 2008-179210

(51) Int. Cl.
  *B65H 81/00*  (2006.01)
  *F17C 1/06*  (2006.01)
  (Continued)

(52) U.S. Cl.
  CPC . *F17C 1/06* (2013.01); *B29C 63/24* (2013.01); *H01M 8/04201* (2013.01);
  (Continued)

(58) Field of Classification Search
  CPC ........ B29C 53/66; B29C 70/16; B29C 63/24; Y02E 60/50; Y02E 60/321; B29K 2077/00; B29L 2009/00; B29L 2031/7156; B29L 2031/7172; F17C 1/06; F17C 2201/0109; F17C 2201/058; F17C 2203/0604; F17C 2203/0619; F17C 2203/0621; F17C 2203/066; F17C 2203/0663; F17C 2203/0673; F17C 2205/0397; F17C 2209/00; F17C 2209/2154; F17C 2209/232; F17C 2221/012; F17C 2223/0123; F17C 2223/036; F17C 2260/036; F17C 2270/0105; F17C 2270/0184; F17C 2270/0189; H01M 8/04201
  USPC .......... 156/172, 169, 185, 188, 175; 220/588, 220/589, 590; 264/235, 346, 79, 83
  See application file for complete search history.

(56) References Cited

U.S. PATENT DOCUMENTS 2,372,800 A   8/1942  Stearns
2,345,583 A   4/1944  Chaney et al.
(Continued)

FOREIGN PATENT DOCUMENTS

DE    200 15 425 U1   3/2001
JP    8-1813 A        1/1996
(Continued)

OTHER PUBLICATIONS

Japanese Office Action in parent application No. JP 2008-179210 issued May 6, 2011 and English translation thereof.
Extended European Search Report of EP 09794260.1-2425 issued Jul. 8, 2011.
Japanese Office Action in parent application No. JP 2008-179210 issued Aug. 27, 2009 and English translation thereof.
Patentable claims in JP 2008-179210 and English translation thereof.

*Primary Examiner* — Jacob T Minskey
*Assistant Examiner* — Vishal I Patel
(74) *Attorney, Agent, or Firm* — Kenyon & Kenyon LLP

(57) ABSTRACT

A gas tank is provided which can ensure high gas barrier properties even with respect to a gas having a small molecular size, for example, a hydrogen gas. In a high-pressure gas tank comprising a resin liner inside an FRP layer, an oxide layer is formed on the inner surface of the resin liner. When a reinforcing fiber is wound around the outer surface of the resin liner by a filament winding process, air is beforehand enclosed inside the resin liner. Next, when the reinforcing fiber is thermally cured to form the FRP layer, the inner surface of the resin liner is thermally oxidized to form the oxide layer.

2 Claims, 9 Drawing Sheets

(51) Int. Cl.
  *B29C 63/24* (2006.01)
  *H01M 8/04* (2006.01)
  *B29C 53/66* (2006.01)
  *B29C 70/16* (2006.01)
  *B29K 77/00* (2006.01)
  *B29L 9/00* (2006.01)
  *B29L 31/00* (2006.01)

(52) U.S. Cl.
  CPC ............... *B29C 53/66* (2013.01); *B29C 70/16* (2013.01); *B29K 2077/00* (2013.01); *B29L 2009/00* (2013.01); *B29L 2031/7156* (2013.01); *B29L 2031/7172* (2013.01); *F17C 2201/0109* (2013.01); *F17C 2201/056* (2013.01); *F17C 2201/058* (2013.01); *F17C 2203/0604* (2013.01); *F17C 2203/066* (2013.01); *F17C 2203/0619* (2013.01); *F17C 2203/0621* (2013.01); *F17C 2203/0663* (2013.01); *F17C 2203/0673* (2013.01); *F17C 2205/0397* (2013.01); *F17C 2209/00* (2013.01); *F17C 2209/2118* (2013.01); *F17C 2209/2154* (2013.01); *F17C 2209/232* (2013.01); *F17C 2221/012* (2013.01); *F17C 2223/0123* (2013.01); *F17C 2223/036* (2013.01); *F17C 2260/036* (2013.01); *F17C 2270/0105* (2013.01); *F17C 2270/0184* (2013.01); *F17C 2270/0189* (2013.01); *F17C 2270/0763* (2013.01); *Y02E 60/321* (2013.01); *Y02E 60/50* (2013.01)

(56) References Cited

U.S. PATENT DOCUMENTS

| | | | |
|---|---|---|---|
| 2,860,801 A | | 11/1958 | Nielsen |
| 3,282,757 A | * | 11/1966 | Brussee .................... 156/69 |
| 3,567,536 A | | 3/1971 | Wickersham, Jr. |
| 3,833,430 A | | 9/1974 | Hill et al. |
| 3,993,811 A | | 11/1976 | Walles |
| 4,581,086 A | * | 4/1986 | Gill et al. .................. 156/175 |
| 4,783,232 A | * | 11/1988 | Carbone et al. ............ 156/172 |
| 4,988,011 A | | 1/1991 | Fenton et al. |
| 5,025,943 A | * | 6/1991 | Forsman .................... 220/589 |
| 5,150,812 A | | 9/1992 | Adams |
| 5,217,140 A | | 6/1993 | Lindahl |
| 5,758,796 A | | 6/1998 | Nishimura et al. |
| 6,190,481 B1 | | 2/2001 | Iida et al. |
| 2004/0140593 A1 | | 7/2004 | Oda et al. |
| 2006/0065664 A1 | * | 3/2006 | Ohta et al. ................. 220/588 |
| 2007/0089764 A1 | | 4/2007 | Klassen et al. |
| 2008/0121643 A1 | | 5/2008 | Blencoe et al. |
| 2008/0251520 A1 | | 10/2008 | Ota et al. |

FOREIGN PATENT DOCUMENTS

| | | |
|---|---|---|
| JP | 2002-370750 A | 12/2002 |
| JP | 2006-242247 A | 9/2006 |
| JP | 2006-316834 A | 11/2006 |
| JP | 2006-316934 A | 11/2006 |
| JP | 2006-326394 A | 12/2006 |

* cited by examiner

GAS TANK AND MANUFACTURING METHOD OF GAS TANK

This is a division of application Ser. No. 13/003,064 filed 7 Jan. 2011, which is a 371 national phase application of PCT/JP2009/060067 filed 2 Jun. 2009, which claims priority to Japanese Patent Application No. JP 2008-179210 filed 9 Jul. 2008, the contents of which are incorporated herein by reference.

FIELD OF THE INVENTION

The present invention relates to a gas tank and a manufacturing method of the gas tank.

BACKGROUND OF THE INVENTION

In a fuel cell system disposed in a vehicle such as a car, a high-pressure gas tank is used as a supply source of a fuel gas. As this type of gas tank, for example, a gas tank having a reinforcing layer formed on the outer surface of a resin liner (an inner container) is used (see Patent Document 1). The reinforcing layer is usually formed by winding a resin-containing fiber around the outer surface of the resin liner by a filament winding (FW) process, followed by thermal curing.

The above gas tank is requested to have high gas barrier properties to prevent leakage of the fuel gas due to permeation. As a method for ensuring the gas barrier properties, Patent Document 2 discloses a method in which the inner surface of an inner shell of a gas container is covered with a film of a fluorine resin, to prevent the permeation of a natural gas as the fuel gas.

PRIOR ART DOCUMENTS

Patent Documents

[Patent Document 1] Japanese Patent Application Laid-Open No. 2006-242247
[Patent Document 2] Japanese Patent Application Laid-Open No. 8-1813

SUMMARY OF THE INVENTION

Problem to be Solved by the Invention

However, in the above method, gas barrier properties with respect to a natural gas having a comparatively large molecular size can be ensured, but sufficient gas barrier properties with respect to a gas having a comparatively small molecular size, for example, a hydrogen gas cannot be obtained.

The present invention has been developed in view of such a situation, and an object thereof is to provide a gas tank which can ensure high gas barrier properties even with respect to a gas having a small molecular size, for example, a hydrogen gas, and a manufacturing method of the gas tank.

Means for Solving the Problem

To achieve the above object, the present invention provides a gas tank comprising a resin liner inside a reinforcing layer, characterized in that an oxide layer is formed on the resin liner.

According to the present invention, the oxide layer can ensure high gas barrier properties even with a gas having a small molecular size, for example, a hydrogen gas.

The oxide layer may be formed on the inner surface of the resin liner. In such a case, a gas in the tank is inhibited from permeating the resin liner itself, and hence deterioration of the resin liner due to the gas can be prevented.

The oxide layer may be formed in a thickness of 50 to 100 µm. When the oxide layer is formed in such a thickness, elongation properties of the whole resin liner can be kept while sufficiently ensuring the gas barrier properties. When the elongation properties of the whole resin liner is kept, deformation due to heat or a load can flexibly be handled, and strength of the gas tank can be ensured.

The above oxide layer may be a layer formed by oxidizing the same resin as that of the resin liner. In such a case, the oxide layer is made of the same mother material as that of the resin liner, and hence, for example, the deformation due to the heat or the load occurs at the same level. In consequence, for example, bonding properties between the resin liner and the oxide layer enhance.

The above oxide layer may be formed by oxidizing the resin liner. In such a case, the oxide layer does not peel off the resin liner.

The above resin liner may be made of a polyamide resin. In such a case, the gas barrier properties of the oxide layer further enhance.

The above gas tank may be configured to store a hydrogen gas. The hydrogen gas has a comparatively small molecular size and, accordingly, easily allows permeation. When the gas tank according to the present invention is used for the storage of the hydrogen gas, a large effect is produced.

According to the present invention of another aspect, there is provided a manufacturing method of a gas tank characterized by comprising a step of enclosing an oxygen-containing gas inside a resin liner and winding a reinforcing fiber around the outer surface of the resin liner by a filament winding process; and a step of thermally curing the reinforcing fiber around the outer surface of the resin liner to form a reinforcing layer and thermally oxidizing the inner surface of the resin liner to form an oxide layer.

In such a case, the oxide layer can be formed on the inner surface of the resin liner while forming the reinforcing layer on the outer surface of the resin liner, whereby the gas tank comprising the oxide layer can easily be manufactured by utilizing the existing steps.

The manufacturing method of the gas tank further comprises, before the step of winding the reinforcing fiber, a step of injection-forming the resin liner and then subjecting the resin liner to a heating treatment, and the step of performing the heating treatment may also supply an oxygen-containing gas into the resin liner to thermally oxidize the inner surface of the resin liner.

The thermal oxidation of the inner surface of the resin liner may be performed at a temperature of 130° C. in an air atmosphere for 10 to 20 hours. In such a case, it is possible to realize the resin liner which is excellent in both gas barrier properties and elongation properties. It is to be noted that when the thermal oxidation is performed in the step of performing the heating treatment of the resin liner, the total time of the thermal oxidation to form the reinforcing layer and the thermal oxidation to subject the resin liner to the heating treatment is from 10 to 20 hours.

Effect of the Invention

According to the present invention, high gas barrier properties can be ensured even with respect to a gas having a small molecular size, for example, a hydrogen gas.

DETAILED DESCRIPTION

Figure 1:
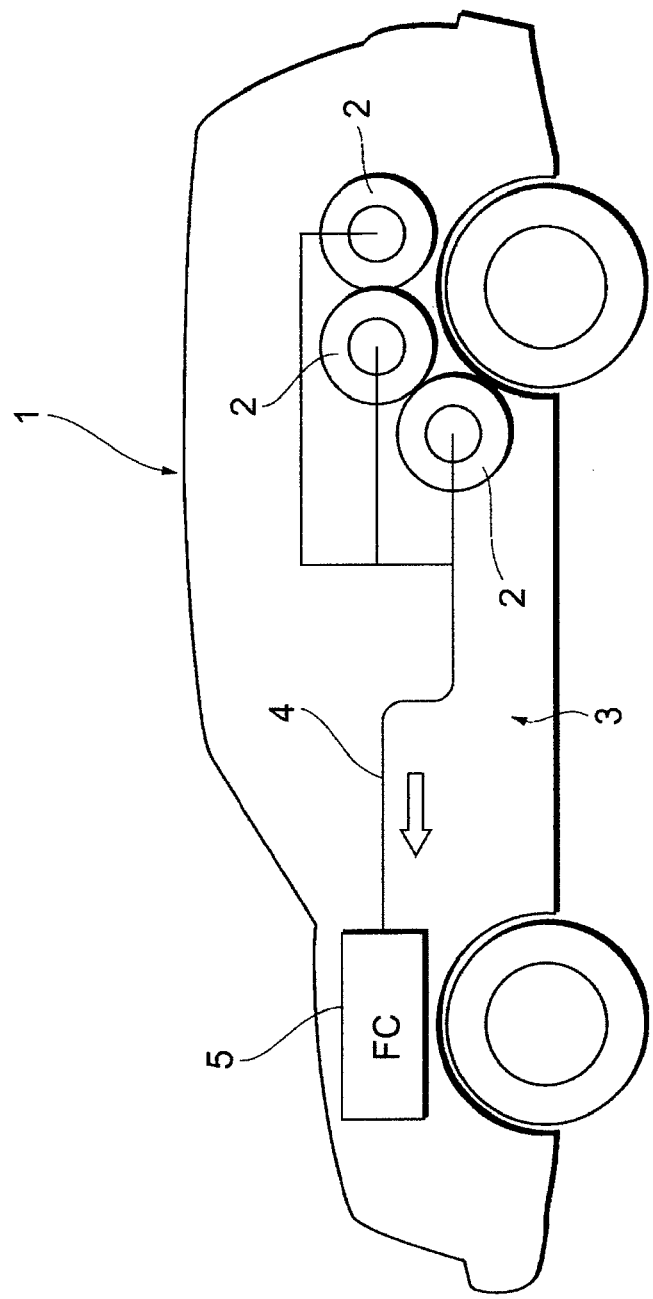
FIG. 1 is an exemplary diagram of a fuel cell car in which high-pressure gas tanks are disposed.

Hereinafter, a preferable embodiment of the present invention will be described with reference to the drawings. FIG. 1 is an exemplary diagram of a fuel cell car 1 in which gas tanks according to the present embodiment are disposed.

In the fuel cell car 1, for example, three high-pressure gas tanks 2 are disposed in the rear part of a car body. The high-pressure gas tanks 2 constitute a part of a fuel cell system 3 so that a fuel gas can be supplied to a fuel cell 5 from the high-pressure gas tanks 2 through a gas supply line 4. The fuel gas stored in the high-pressure gas tanks 2 is a combustible high-pressure gas such as a hydrogen gas. It is to be noted that the high-pressure gas tanks 2 can be applied not only to the fuel cell car 1 but also to vehicles such as an electric car and a hybrid car, various mobile units (e.g., a boat, an airplane, a robot, etc.) and stational facilities (a housing and a building).

Figure 2:
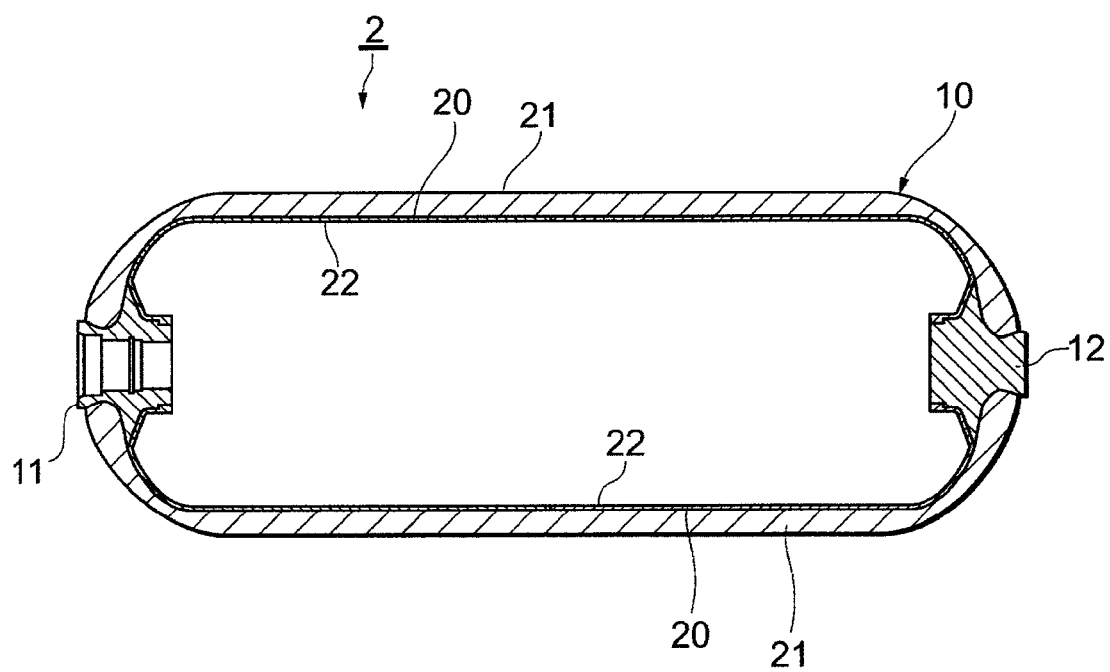
FIG. 2 is a vertically sectional view schematically showing a constitution of the high-pressure gas tank.

FIG. 2 is a vertically sectional view schematically showing a constitution of the high-pressure gas tank 2. The high-pressure gas tank 2 comprises a tank main body 10 which is, for example, a schematically elliptic body, and ferrule portions 11 and 12 attached to both ends of the tank main body 10 in a longitudinal direction.

The tank main body 10 has, for example, a double layer structure, and comprises an inner resin liner 20 and a fiber reinforced plastics (FRP) layer 21 as a reinforcing layer which covers the outer surface of the resin liner 20.

The resin liner 20 has a substantially elliptic shape in the same manner as in the tank main body 10. The resin liner 20 is made of a polyamide resin such as nylon 6 or nylon 6, 6. The resin liner 20 has a thickness of, for example, about 3 mm.

The FRP layer 21 is made of a resin-containing fiber. As the resin of the FRP layer 21, for example, an epoxy resin, a denatured epoxy resin, an unsaturated polyester resin or the like is used. Moreover, as the fiber, a carbon fiber, a metal fiber or the like is used.

Figure 3:
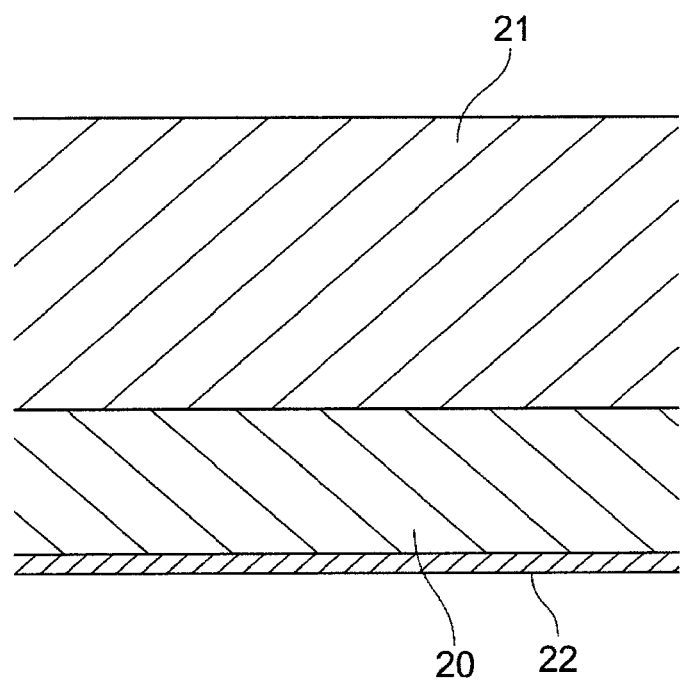
FIG. 3 is an enlarged vertically sectional view of a wall portion of the high-pressure gas tank.

An oxide layer 22 is formed on the whole inner surface of the resin liner 20. FIG. 3 is an enlarged explanatory view of a wall portion of the high-pressure gas tank 2. The oxide layer 22 is formed by oxidizing the resin of the inner surface of the resin liner 20 as described later. The oxide layer 22 is formed in a thickness of, for example, about 50 to 100 μm with respect to the resin liner 20 having a thickness of, for example, about 3 mm.

Figure 4:
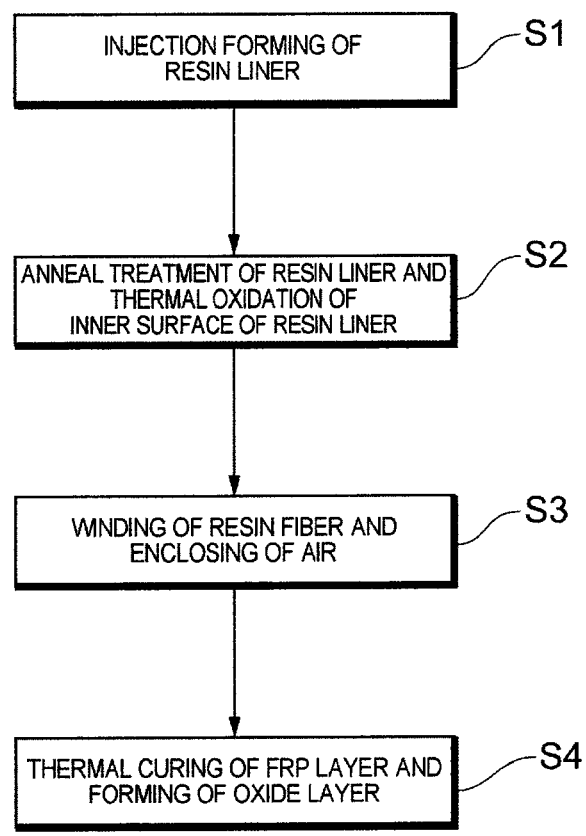
FIG. 4 is a flowchart showing main steps of a manufacturing method of the high-pressure gas tank.

Next, a manufacturing method of the high-pressure gas tank 2 having the above constitution will be described. FIG. 4 is a flowchart showing one example of main steps of such a manufacturing method.

First, the resin liner 20 is injection-formed (step S1 of FIG. 4). For example, a polyamide resin is poured into a mold to form two substantially semielliptic members, and these members are welded to form the resin liner 20. By this injection forming, the resin liner 20 having a uniform thickness is formed.

Figure 5:
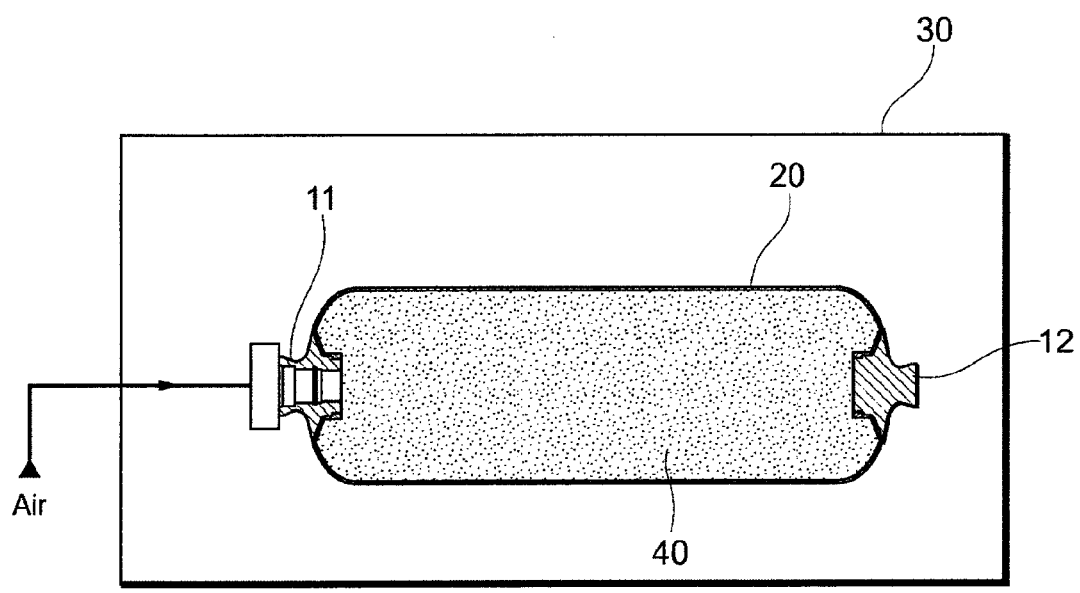
FIG. 5 is an explanatory view showing behavior of a step of performing a heating treatment of a resin liner.

Next, the resin liner 20 is subjected to a heating treatment (an anneal treatment) on predetermined conditions in a heating chamber 30 as shown in, for example, FIG. 5. In this anneal treatment, for example, air 40 is supplied as an oxygen-containing gas into the resin liner 20. The anneal treatment is performed, for example, on the conditions that an internal pressure is an atmospheric pressure and a temperature is about 130° C. for about five hours. In consequence, a remaining stress of the resin liner 20 is removed, and a part of the inner surface of the resin liner 20 is thermally oxidized (step S2 of FIG. 4).

Figure 6:
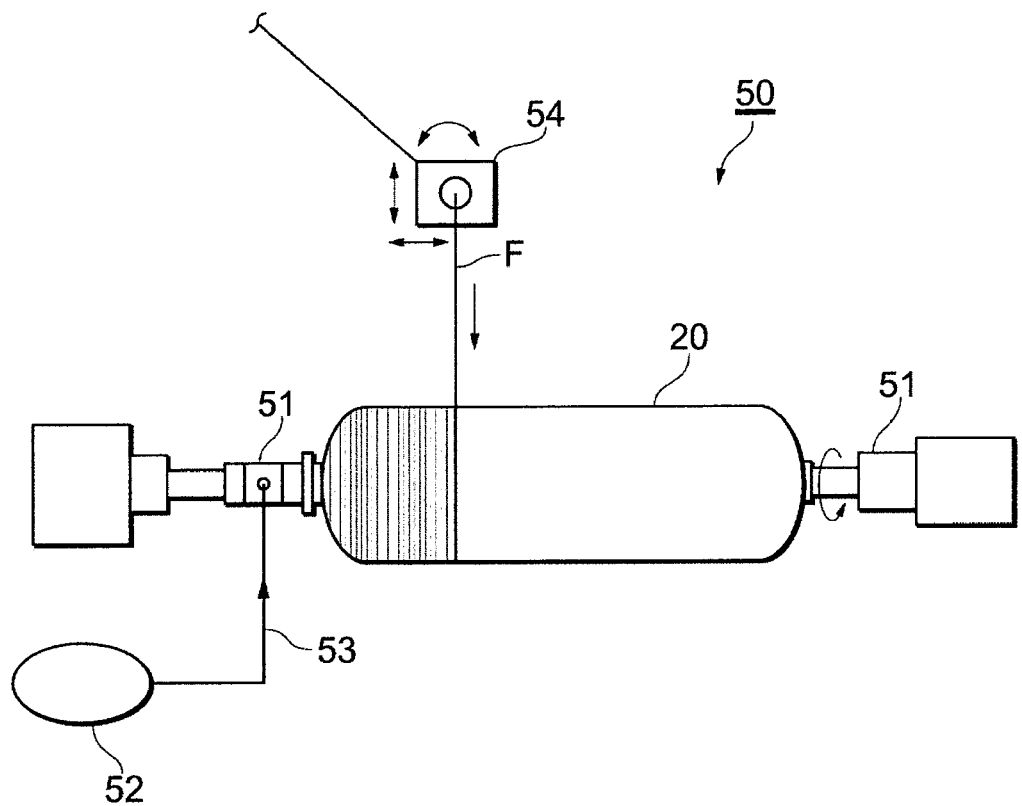
FIG. 6 is an explanatory view showing behavior of a step of winding a resin fiber around the resin liner.

After the end of the anneal treatment, the resin liner 20 is installed at a rotation support portion 51 of a fiber winding device 50 as shown in FIG. 6. The rotation support portion 51 is connected to a gas supply tube 53 leading to a gas container 52 of the air which is, for example, the oxygen-containing gas, so that the air of the gas container 52 can be supplied into the resin liner 20 through the gas supply tube 53 and the rotation support portion 51.

When the resin liner 20 is supported by the rotation support portion 51, the rotation support portion 51 rotates, whereby the resin liner 20 is rotated to wind a polyamide resin fiber F around the outer surface of the resin liner 20. The resin fiber F is impregnated with a thermoplastic resin at an upstream portion. Afterward, the angle of the fiber is regulated by a fiber guide portion 54, thereby winding the fiber around the resin liner 20. In this case, the air is supplied through the gas supply tube 53 and enclosed in the resin liner 20. In consequence, the resin fiber F can be wound to prevent the resin liner 20 from being dented. In this way, the resin fiber F is wound around the whole outer surface of the resin liner 20 with a predetermined thickness (step S3 of FIG. 4).

Figure 7:
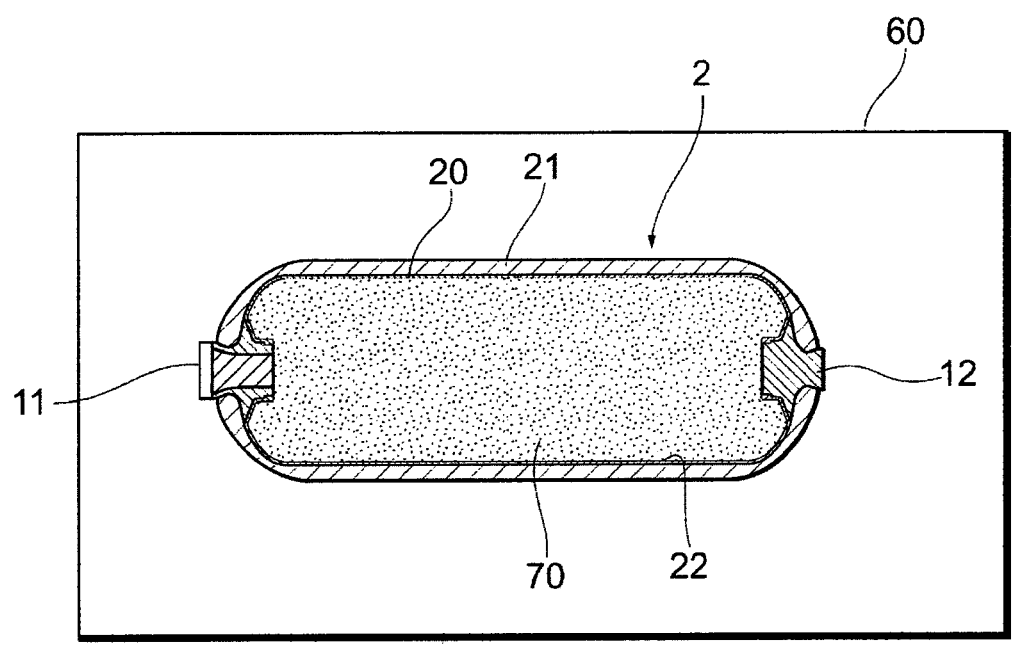
FIG. 7 is an explanatory view showing behavior of a step of thermally curing the resin fiber.
Figure 8:
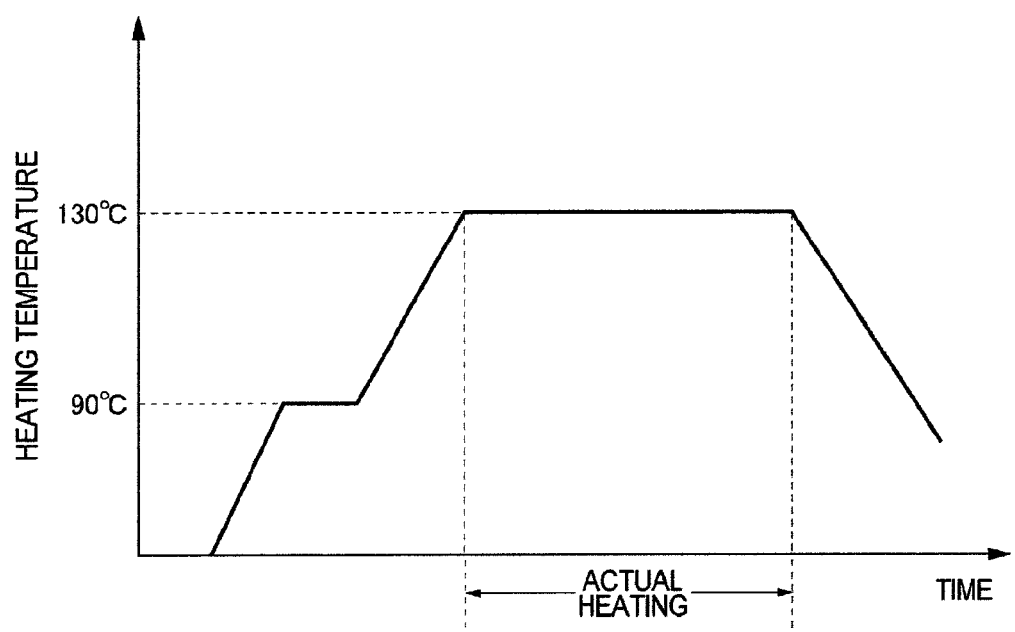
FIG. 8 is an explanatory view showing a fluctuation of a heating temperature in the step of thermally curing the resin fiber.

After the step of winding the resin fiber F, the high-pressure gas tank 2 is thermally treated in a heating furnace 60 as shown in FIG. 7. As shown in, for example, FIG. 8, the high-pressure gas tank 2 is preliminarily heated at about 90° C., and then actually heated at about 130° C. for about 5 to 15 hours. By this actual heating, the resin fiber F is thermally cured to form the FRP layer 21. Moreover, as shown in FIG. 7, by the actual heating, the resin of the inner surface of the resin liner 20 is thermally oxidized by air 70 inside the resin liner 20, to form the oxide layer 22 having a thickness of about 50 to 100 μm on the inner surface of the resin liner 20 (step S4 of FIG. 4). Afterward, the high-pressure gas tank 2 is cooled. In this way, the high-pressure gas tank 2 comprising the oxide layer 22 on the inner surface of the resin liner 20 is manufactured.

Figure 9:
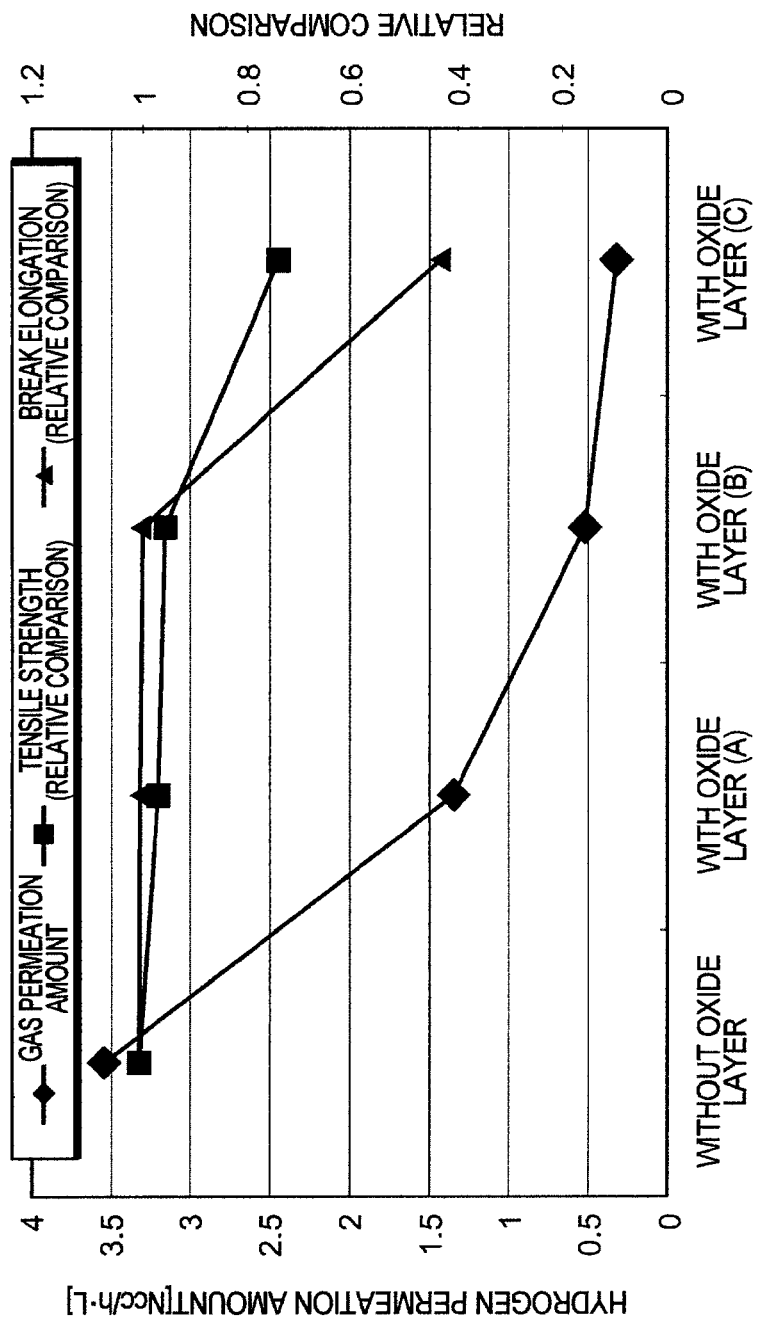
FIG. 9 shows experiment results which verify gas barrier properties and elongation properties of an oxide layer formed on various conditions.

Here, gas barrier properties and elongation properties of the gas tank comprising the oxide layer on the inner surface of the resin liner will be verified. FIG. 9 shows experiments which verify a hydrogen gas permeation amount of the resin liner on various conditions, and experiment results which verify tensile strength and break elongation of the oxide layer on the respective conditions.

The experiments are performed on conditions that there is not any oxide layer (thermal oxidation at 130° C. in a 99.9% helium gas environment for 15 hours), the oxide layer is present (A) (thermal oxidation at 130° C. in an atmospheric environment for 5 hours), the oxide layer is present (B) (thermal oxidation at 130° C. in the atmospheric environment for 15 hours), and the oxide layer is present (C) (thermal oxidation at 130° C. in the atmospheric environment for 50 hours).

It can be confirmed from FIG. 9 that in the case of (A), (B) and (C) where the oxide layer is present, as compared with a case where there is not any oxide layer, the permeation amount of the hydrogen gas largely decreases. Moreover, it can be considered that the permeation amount of the hydrogen gas decreases in order of (A), (B) and (C), that is, as the thermal oxidation time lengthens. Furthermore, the gas barrier properties and the elongation properties usually have a tradeoff relation. When the gas barrier properties enhance, the elongation properties lower. However, in the case of (A) to (C) each provided with the oxide layer, the tensile strength and the break elongation do not entirely noticeably deteriorate. It can be confirmed that (A) and (B) each provided with the oxide layer are more excellent that (C) provided with the oxide layer. It is to be noted that in relative comparison of the tensile strength and the break elongation in FIG. 9, the case where there is not any oxide layer is regarded as 1 to relatively compare the cases (A), (B) and (C) each provided with the oxide layer.

According to such an experiment, it can be confirmed that the oxide layer is formed to enhance the gas barrier properties with respect to a gas having a small molecular size, for example, the hydrogen gas. Moreover, it can be confirmed that the thermal oxidation is performed at 130° C. for about 10 to 20 hours, which are close to the conditions of (B) provided with the oxide layer, to obtain the oxide layer having high gas barrier properties and the elongation properties which do not lower.

According to the above present embodiment, since the oxide layer 22 is formed on the resin liner 20, the high gas barrier properties can be ensured even with the gas having the small molecular size, for example, the hydrogen gas.

Meanwhile, in the above-mentioned method using the covering film of the fluorine resin as disclosed in Patent Document 2 (Japanese Patent Application Laid-Open No. 8-1813), during blow forming of the gas container, a fluorine-containing nitrogen gas is used as the gas to be blown, to form the covering film of the fluorine resin. However, when the covering film of the fluorine resin is actually formed by this method, strict conditions such as a high temperature and a high pressure are required, a large number of steps are necessary, and manufacturing is not easily performed. Moreover, in this method, it is feared that a harmful fluorine compound is generated for some reason when the fluorine resin is decomposed. On the other hand, according to the present embodiment, the oxide layer 22 can easily be formed, and hence the high-pressure gas tank 2 can easily be manufactured. Moreover, if the oxide layer 22 is decomposed, any harmful compound is not easily generated, and safety can be enhanced.

Furthermore, in the above embodiment, since the oxide layer 22 is formed on the inner surface of the resin liner 20, the gas in the tank is inhibited from permeating the resin liner 20 itself, whereby the deterioration of the resin liner 20 due to the gas can be prevented.

Since the oxide layer 22 is formed in a thickness of 50 to 100 μm, the elongation properties of the whole resin liner 20 can sufficiently be ensured while ensuring the high gas barrier properties. When the elongation properties of the whole resin liner 20 are ensured, the sufficient strength of the high-pressure gas tank 2 can be ensured.

Since the oxide layer 22 is a layer formed by oxidizing the resin of the resin liner 20, the oxide layer 22 is made of the same mother material as that of the resin liner 20, and, for example, deformation due to heat or a load occurs at the same level. In consequence, for example, bonding properties between the resin liner 20 and the oxide layer 22 enhance.

In Japanese Patent Application Laid-Open No. 2006-316934, it is disclosed that the metal layer is formed on the inner surface of the resin liner. In this case, bonding properties between the metal layer and the resin liner or peeling properties raise problems, but according to the present embodiment, since the oxide layer 22 is formed by oxidizing the resin liner 20, the bonding properties between the oxide layer 22 and the resin liner 20 are high, and the oxide layer 22 do not peel off the resin liner 20.

According to the above thermal oxidation, since the resin liner 20 is made of the polyamide resin, the gas barrier properties of the oxide layer 22 further enhance. This is supposedly because when the polyamide resin is oxidized, the molecular structure of the resin becomes three-dimensional, thereby enhancing denseness. For example, in the case of nylon 6, 6, an α-order methylene group of a carboxyl group is oxidized to form ketone, and changes to a compound having an enol group. This compound reacts with another polyamide amino group end, and is cyclized to obtain a three-dimensional structure.

In the manufacturing method of the high-pressure gas tank 2 described in the above embodiment, in the step of winding the resin fiber F around the outer surface of the resin liner 20, the air 70 is enclosed inside the resin liner 20. In the step of thermally curing the resin fiber F, the inner surface of the resin liner 20 can thermally be oxidized to form the oxide layer 22, whereby the high-pressure gas tank 2 comprising the oxide layer 22 can easily be manufactured by utilizing the existing steps.

Moreover, in the above embodiment, also in the steps of injection-forming the resin liner 20 and then subjecting the resin liner 20 to the anneal treatment, the air 40 is supplied into the resin liner 20, and the inner surface of the resin liner 20 is thermally oxidized. In this way, a part of the oxide layer 22 can be formed by utilizing the heating treatment of the resin liner 20 after the injection forming, whereby the oxide layer 22 can more efficiently be formed.

In the above embodiment, the thermal oxidation during the anneal treatment of the resin liner 20 (the step S2 of FIG. 4) and the thermal oxidation during the thermal curing of the resin fiber F (the step S4 of FIG. 4) are combined to perform the thermal oxidation of the resin liner 20 at 130° C. in the air atmosphere for 10 to 20 hours. In consequence, it is possible to realize the resin liner 20 which is excellent in both the gas barrier properties and the elongation properties as verified by the above experiments.

The preferable embodiment of the present invention has been described above with reference to the accompanying drawings, but the present invention is not limited to such an example. It is obvious for a person with ordinary skill that various alteration examples or modification examples can be thought upon in the category of an idea described in claims, and it can be understood that, needless to say, these examples belong to the technical scope of the present invention.

For example, in the above embodiment, the gas supplied into the resin liner 20 to form the oxide layer 22 is the air, but any gas such as an oxygen gas may be used as long as the gas contains oxygen. Moreover, the material of the resin liner 20 is not limited to the polyamide resin, and a polyethylene resin, an ethylene-vinyl alcohol copolymer resin or another resin such as a thermoplastic resin may be used.

Furthermore, in the above embodiment, also during the anneal treatment after the injection forming of the resin liner 20, the inner surface of the resin liner 20 is thermally oxidized, but in this stage, the thermal oxidation does not necessarily have to be performed, and the thermal oxidation may be performed only during the thermal curing of the resin fiber F. Moreover, in the above embodiment, the oxide layer 22 is formed on the inner surface of the resin liner 20, but the oxide layer 22 may be formed on the outer surface of the resin liner 20 or an intermediate layer.

DESCRIPTION OF REFERENCE NUMERALS

2 high-pressure gas tank
20 resin liner
21 FRP layer
22 oxide layer
F resin fiber

What is claimed is:
1. A manufacturing method of a gas tank comprising:
a step of injection-forming a resin liner that is made of polyamide resin:
a step of subjecting a resin liner to heating treatment after injection-forming the resin liner, and supplying an oxygen-containing gas into the resin liner to thermally oxidize the inner surface of the resin liner, thereby forming a part of an oxide layer;
a step of winding a reinforcing fiber around the outer surface of the resin liner by a filament winding process while providing and enclosing an oxygen-containing inside a resin liner through a gas supply tube from a gas source; and
a step of thermally curing the reinforcing fiber around the outer surface of the resin liner to form a reinforcing layer and thermally oxidizing the inner surface of the resin liner to form an oxide layer.
2. The manufacturing method of the gas tank according to claim 1, wherein the thermal oxidation of the inner surface of the resin liner is performed at a temperature of 130° C. in an air atmosphere for 10 to 20 hours.

* * * * *